United States Patent
Shelton et al.

(10) Patent No.: US 7,091,901 B2
(45) Date of Patent: Aug. 15, 2006

(54) TRAFFIC RADAR SYSTEM WITH IMPROVED PATROL SPEED CAPTURE

(75) Inventors: Maurice E. Shelton, Buffalo, KS (US); Steven F. Hocker, Olathe, KS (US)

(73) Assignee: Kustom Signals, Inc., Lenexa, KS (US)

( * ) Notice: Subject to any disclaimer, the term of this patent is extended or adjusted under 35 U.S.C. 154(b) by 0 days.

(21) Appl. No.: 11/076,003

(22) Filed: Mar. 9, 2005

(65) Prior Publication Data

US 2005/0253749 A1 Nov. 17, 2005

Related U.S. Application Data

(60) Provisional application No. 60/571,350, filed on May 14, 2004.

(51) Int. Cl.
*G01S 13/58* (2006.01)
*G01S 13/00* (2006.01)

(52) U.S. Cl. ............... 342/104; 342/114; 342/115; 342/175; 342/195

(58) Field of Classification Search ........ 342/104–117, 342/165–174, 175, 192–197; 340/936
See application file for complete search history.

(56) References Cited

U.S. PATENT DOCUMENTS

| | | | | |
|---|---|---|---|---|
| 4,236,140 A | * | 11/1980 | Aker et al. | 342/115 |
| 4,335,382 A | * | 6/1982 | Brown et al. | 342/104 |
| 4,335,383 A | * | 6/1982 | Berry | 342/115 |
| 4,988,994 A | * | 1/1991 | Loeven | 340/936 |
| 5,525,996 A | * | 6/1996 | Aker et al. | 342/104 |
| 5,528,245 A | * | 6/1996 | Aker et al. | 342/104 |
| 5,528,246 A | * | 6/1996 | Henderson et al. | 342/115 |
| 5,565,871 A | * | 10/1996 | Aker et al. | 342/104 |
| 5,691,724 A | * | 11/1997 | Aker et al. | 342/104 |
| 6,008,752 A | * | 12/1999 | Husk et al. | 342/104 |
| 6,023,236 A | * | 2/2000 | Shelton | 342/104 |
| 6,417,796 B1 | * | 7/2002 | Bowlds | 342/104 |
| 6,501,418 B1 | * | 12/2002 | Aker | 342/104 |
| 6,580,386 B1 | * | 6/2003 | Aker et al. | 342/104 |
| 6,744,379 B1 | * | 6/2004 | Aker et al. | 340/936 |
| 6,831,593 B1 | * | 12/2004 | Aker et al. | 342/114 |

* cited by examiner

*Primary Examiner*—Bernarr E. Gregory
(74) *Attorney, Agent, or Firm*—Chase Law Firm, L.C.

(57) ABSTRACT

A traffic radar captures the patrol vehicle return signal by saving the patrol return when the radar system is placed in a standby state. If the radar is in standby for more than a predetermined period of time before reentering a transmitting mode, the system searches for a new patrol signal within a speed window around the saved patrol signal speed. If the radar is in standby for less than the predetermined period of time, the system initially searches for a new patrol signal over a range that excludes an interval around the saved patrol signal speed. If the new patrol signal is not found, then in a subsequent search the interval is included in the searched spectrum.

10 Claims, 2 Drawing Sheets

TRAFFIC RADAR SYSTEM WITH IMPROVED PATROL SPEED CAPTURE

CROSS REFERENCE TO RELATED APPLICATIONS

This application claims the benefit of prior filed, co-pending Ser. No. 60/571,350, filed May 14, 2004, entitled TRAFFIC RADAR SYSTEM WITH IMPROVED PATROL SPEED CAPTURE.

FIELD OF THE INVENTION

The present invention relates to a traffic radar system and, in particular, to a traffic radar system which utilizes an improved algorithm to determine and capture the patrol vehicle speed.

BACKGROUND OF THE INVENTION

Traffic radar systems are widely used in law enforcement. Since the introduction of the first moving radar system, there have been anomalies known as combining and shadowing. Combining may occur when the combined patrol car return signal and oncoming target's return signal is of greater strength than the actual patrol car return signal. Since there may only be a slight difference between a combined signal and a patrol vehicle signal pattern, it may be difficult for the radar system to discern. As a result, if a police officer is traveling in a city environment at a normal patrol speed of 25–35 miles per hour, for example, and an oncoming vehicle is close when the radar unit transmitter is turned on, it is likely that the patrol speed displayed on the radar unit will be the combined speed of the two vehicles instead of the actual patrol speed.

In another similar situation, radar units typically include a "hold" function in which the radar unit is powered on but in standby and not transmitting. When the officer wishes to measure the speed of an oncoming vehicle the hold is removed and the unit begins transmitting and searching for the strongest return signal as the patrol speed in the range of the patrol limits, such as 10–100 miles per hour. If the patrol vehicle is traveling 20 miles per hour and the target vehicle is approaching at 35 miles per hour, the strongest signal may be the combined signal of the two vehicles at 55 miles per hour.

Shadowing may occur at highway speeds when the patrol vehicle is closing on a vehicle traveling in the same direction. The patrol speed is erroneously determined as the difference between the speeds of the two vehicles.

One method of capturing and tracking the patrol vehicle signal is disclosed in U.S. Pat. No. 6,023,236 to Shelton. The '236 patent discloses a digital signal processor (DSP) traffic radar with an input from the vehicle's speedometer which is used to narrow a search window to +/− five miles per hour around the speedometer input speed. As a result, the patrol vehicle signal return is searched for in this narrow window eliminating the problems associated with combining and shadowing. One limitation of this and other systems with a speedometer input to the radar unit is that it may not be practical for a police department to easily access the speedometer wiring and make the necessary connection.

Another method that has been used to reduce patrol speed capture anomalies and does not require a hardwired interface to the vehicle is disclosed in U.S. Pat. No. 5,565,871. The patent describes a process for allowing the rejection of an incorrect patrol speed displayed. The operator can manually reject a captured patrol speed if the operator determines that it is incorrect. However, this system does not reduce initial patrol search errors.

SUMMARY OF THE INVENTION

The present invention provides a method of capturing the patrol vehicle return signal by saving the patrol vehicle signal when the radar system is placed in a standby state. When the radar is returned to an active state and if the radar was in standby for more than a predetermined period of time, the system searches for a new patrol signal limited to a speed window around the saved patrol signal speed. If the radar was in standby for less than a predetermined period of time, the system initially excludes an interval around the saved patrol signal speed.

The present invention improves patrol speed capturing in the absence of a speedometer input. The system can search for the patrol return signal in a reduced area of the return spectrum or exclude from the search an interval in the return spectrum around a known combined or shadow return.

DETAILED DESCRIPTION

Figure 1:
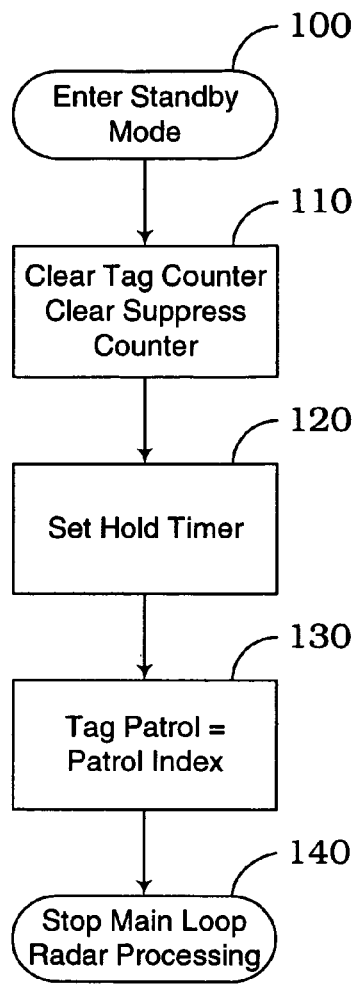
FIG. 1 is a flow chart illustrating a software routine for a standby mode of the radar system of the present invention.

In a traffic radar system, after the system is turned on, the operator places the system in an inactive state often referred to as a standby or a hold mode so that the system is not transmitting. This helps reduce the early detection of the traffic radar transmission by radar detectors in motor vehicles of potential speeders. When the officer wants to obtain the speed of a target vehicle, the officer switches the radar unit to an active transmitting state. If the patrol vehicle is moving, the system first determines the patrol vehicle signal and associated speed and then determines the target vehicle signal and associated speed from all of the return signals. If the target vehicle is traveling in a direction opposite to the direction of the patrol vehicle, the patrol speed is subtracted from the combined speed of the patrol vehicle and the target vehicle to determine the target vehicle speed for display.

When using the radar system in the moving mode, typically the operator will activate and deactivate the transmitter as needed to check the speed of target vehicles. The radar may be in standby mode anywhere from several seconds to several minutes. Each time the operator switches the radar from the standby to active mode, the system first captures the patrol vehicle speed before any target speeds are processed. When the correct patrol speed has been captured after activation it is tracked in each successive processing loop. Since the radar return is processed several times a second in active mode, the patrol speed varies only slightly between loops and is easy to track.

If the patrol vehicle speed was not stored before going into standby, when the system is released from standby, the system searches in the range of patrol speed limits, such as 10–100 mph for the strongest signal return. Anomalies can occur in the patrol speed capture when strong difference speeds caused by shadowing affect returns from other vehicles traveling in the same direction as the patrol vehicle or when the patrol vehicle signal is summed with another vehicle traveling in the opposite direction (combining).

For example, suppose a patrol vehicle is traveling in one direction at a speed of 30 mph, a target vehicle is approaching from the opposite direction at a speed of 40 mph, and the radar unit is not transmitting or in standby. When the operator switches the radar unit to transmitting or active mode, there will be two strong radar returns. One of the returns is the patrol vehicle signal return from which a speed of 30 mph is determined. The other signal return is the combined signal of the patrol vehicle and the approaching target vehicle from which a speed of 70 mph is calculated (30+40). This combined return may mistakenly be found as the patrol speed and 70 mph would be displayed as patrol speed instead of the correct 30 mph. In this situation no target speed will be displayed. To reduce the occurrence of this anomaly, when releasing the radar unit from the standby mode, the search for the patrol speed is limited to an interval around the expected real speed of the patrol vehicle or excludes an interval from the patrol search that is known not to include the speed of the patrol.

To accomplish this desired search criteria the present invention saves the patrol speed when the radar enters the standby mode. This saved patrol speed will be used to set the limits of the patrol search when the radar is returned to the active mode. If the active-to-standby-to-active cycle is seen to be normal, where the radar is in the standby state for longer than a predetermined time, the patrol search is initially limited to an area around the saved patrol speed. If the active-to-standby-to-active cycle is determined to be not normal, where the radar is in the standby state for less than a predetermined time, the patrol search is initially limited to exclude an interval around the saved patrol speed.

Referring to FIG. 1, when the radar unit enters the standby mode, block 100, a Tag Counter and a Suppress Counter are cleared, block 110. The Tag Counter is used to limit the patrol search around a previously stored patrol speed value (Tag Patrol) for a predetermined period of time. The Suppress Counter is used to limit the exclusion of an interval around a combined or shadow speed value (Suppress Patrol) for a predetermined period of time. A hold timer that is used to tell if the unit is in the standby mode for at least a predetermined time is loaded with a value, such as 500 milliseconds for example, to start timing down (block 120). A time constant of 500 milliseconds is used throughout this specification as an example. Other time constants may be used. If there is a current Patrol Index (the frequency bin of the patrol speed) being tracked and displayed as the patrol speed when the system entered standby, the Patrol Index is saved in memory as Tag Patrol (block 130). If there was not a patrol speed displayed when the unit was placed in standby Tag Patrol is set to zero. When the radar unit is placed back into the active mode, the Tag Patrol is recalled to determine the speed of the patrol vehicle when the unit was placed in standby. At block 140 the normal radar main processing routines are suspended until the radar unit exits the standby mode.

Figure 2:
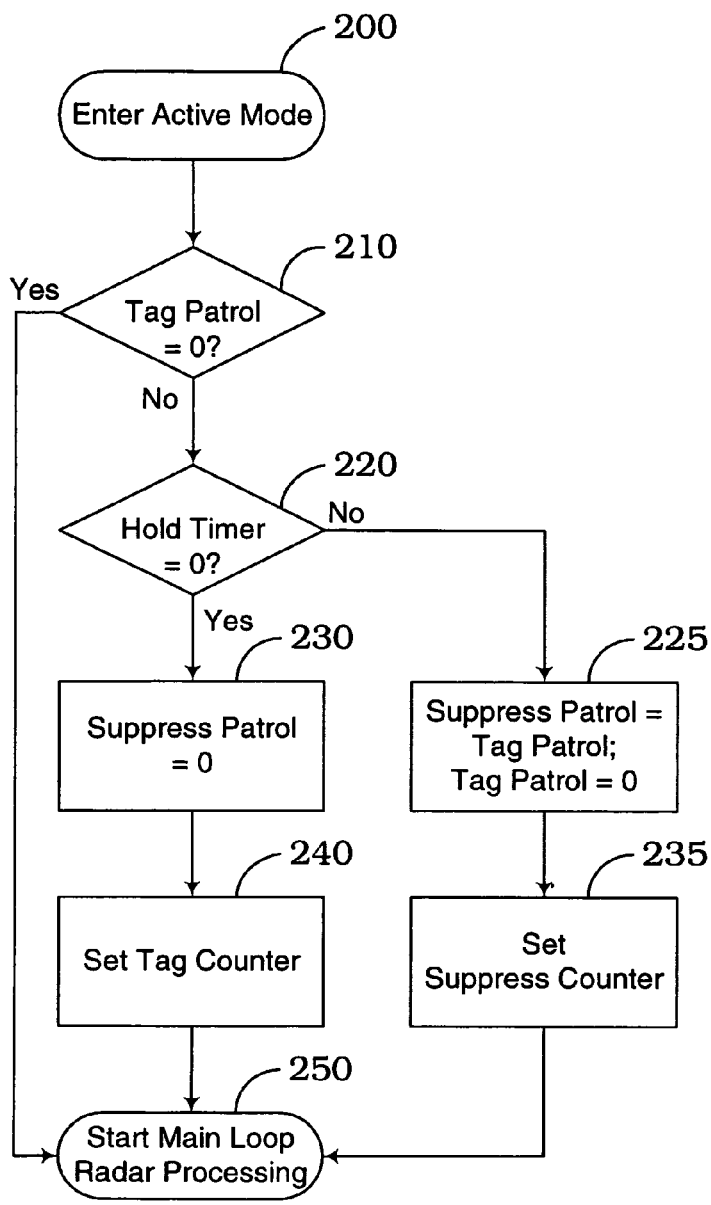
FIG. 2 is a flow chart illustrating a software routine for an active mode of the radar system of the present invention.

Referring to FIG. 2, when the system enters active mode, block 200, a test is made to determine if there is any value in the variable Tag Patrol, decision block 210. If there was no patrol index saved when the unit entered the standby mode, i.e. Tag Patrol=0, then the software branches to start the main radar processing loop, block 250. If there was a value in the Tag Patrol variable, then the next test (decision block 220) determines if the count down Hold Timer is zero. The Hold Timer will be zero if the unit is in standby for at least 500 milliseconds. If the unit was not in standby for at least 500 milliseconds, the Suppress Patrol variable is set to Tag Patrol and then the Tag Patrol variable is set to zero, block 225. Next the Suppress Counter is set to 500 milliseconds, block 235. The processing uses the Suppress Patrol variable to exclude an interval around this value in the search for the patrol speed. Suppress Counter is loaded with a value to set the amount of time to exclude the area around the Suppress Patrol value. If the Hold Timer has expired (decision block 220), Suppress Patrol is set to zero (block 230), the Tag Counter is set to 500 milliseconds (block 240), and processing continues with the main loop radar processing, block 250.

Figure 3:
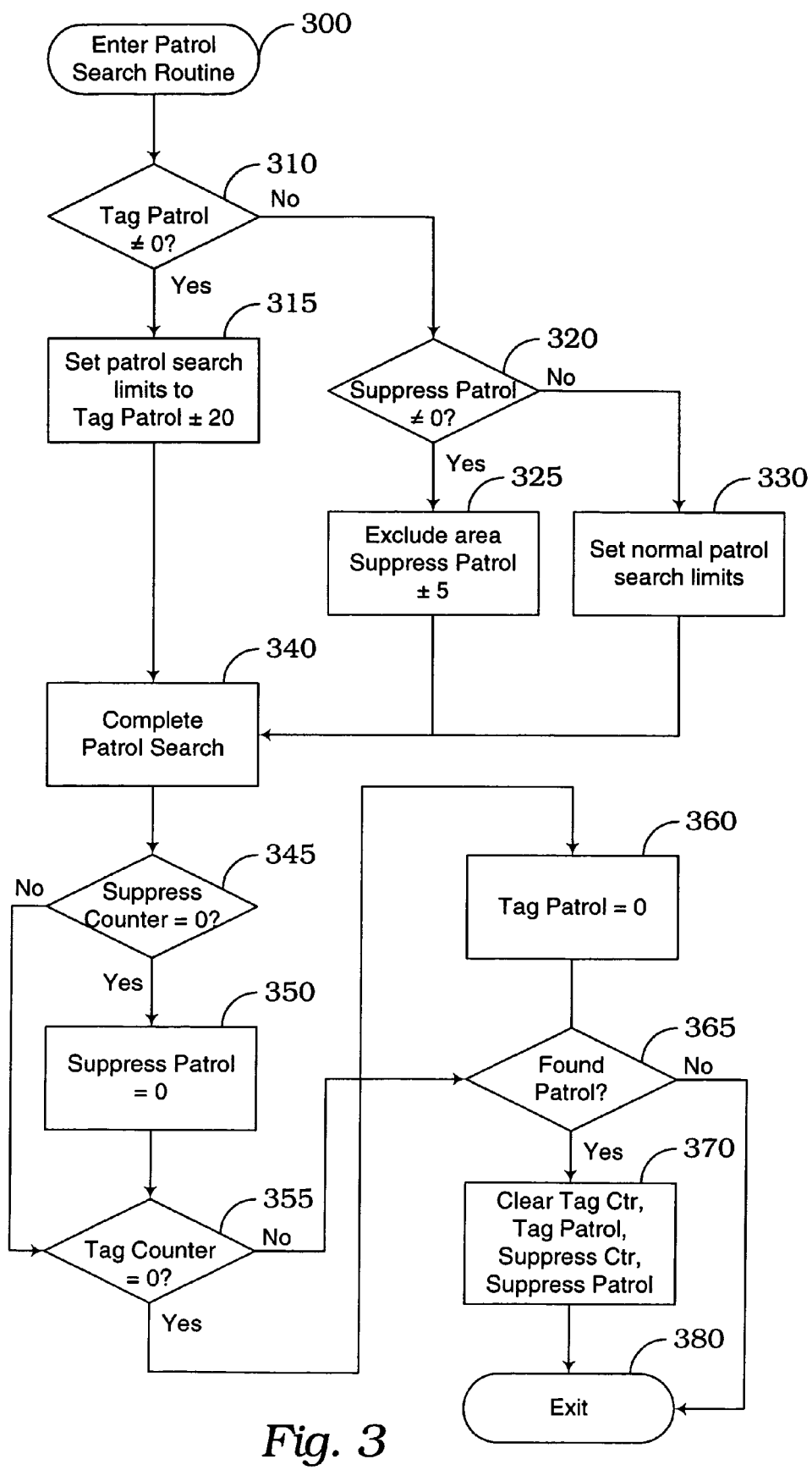
FIG. 3 is a flow chart illustrating a software routine for a patrol vehicle signal search routine of the radar system of the present invention.

Referring to FIG. 3, a flowchart illustrates the functionality of the software for the patrol search routine. The patrol search routine begins (block 300) by checking the value of the Tag Patrol variable (decision block 310). If the Tag Patrol variable is not zero, the limits for the patrol search window are set to +/−20 mph around the Tag Patrol value (block 315). If Tag Patrol is zero (decision block 310), the system checks the value of the Suppress Patrol variable. If Suppress Patrol is not zero, an interval of +/−5 mph around the Suppress Patrol value is excluded from the patrol search (block 325). If the Suppress Patrol variable is equal to zero (decision block 320), the normal patrol search limits are set (block 330) of 10 to 100 mph, for example.

Processing continues at block 340 and the search for the patrol signal is completed. If the Suppress Counter equals zero (decision block 345), the Suppress Patrol variable is set to zero, block 350. These two blocks, 345 and 350 control how long an area will be excluded from the patrol search. If the Suppress Counter is not zero, then the value of the Tag Counter is checked. If the Tag Counter is zero (decision block 355), then the Tag Patrol variable is set to zero, block 360. If the Tag Counter is not zero, processing continues with decision block 365. If the patrol signal was found (decision block 365), the Tag Counter, Tag Patrol, Suppress Counter, and Suppress Patrol variables are set to zero and the patrol search routine exits, block 380. This allows subsequent loops of the patrol search routine to track the found patrol in a manner known in the art. If the patrol signal was not found (decision block 365), the patrol search routine exits, block 380.

It should be appreciated that the software routines of the radar unit are executed approximately ten times per second.

By way of an example, the patrol vehicle is traveling 50 mph with the radar transmitting and the patrol vehicle speed captured and displayed on the radar unit. The operator places the radar unit in standby. The 50 mph value is stored in the Tag Patrol variable. The police officer sees an approaching vehicle (at 75 mph) and switches the radar unit out of standby to begin transmitting again. The system reads the Tag Patrol value and searches for the patrol vehicle signal in the range of 30–70 mph ignoring the signals outside this range. If the patrol vehicle is now traveling 52 mph, this signal is found and displayed. The combined signal of 127 mph is located and the speed of the oncoming vehicle is displayed as 75 mph.

Suppose the patrol vehicle is traveling 30 mph and the radar unit is in standby with the radar not transmitting. The officer sees an approaching vehicle (traveling at 55 mph) and switches the radar unit to transmitting. Initially, the combined signal of the patrol vehicle and the approaching target vehicle is found and displayed as the patrol vehicle speed traveling 85 mph. The officer quickly switches into and out of standby (within 500 milliseconds). The Suppress Patrol variable is set to the combined value of 85 mph and the system searches for the patrol vehicle speed in the range of 10 to 100 mph excluding the interval of 80 to 90 mph. The actual patrol signal is located (30 mph) and displayed. The combined signal may now be located and the target vehicle speed determined and displayed (55 mph).

Suppose the patrol vehicle is traveling 50 mph with the radar transmitting and there is no target vehicle in the radar beam. The user switches into and out of the standby mode within ½ second. The software excludes the area from 45 to 55 mph from the patrol signal search. Since no other signals are present to be captured as the patrol speed, after the Suppress Counter times out after ½ second the signal return corresponding to 50 mph is captured and displayed as the patrol speed.

In another example, suppose the patrol vehicle is traveling 30 mph and the user switches into the standby mode. The 30 mph signal is stored as the Tag Patrol value. While in the standby mode the patrol vehicle increases speed to 65 mph. When the operator switches out of the standby mode the software limits the search for the patrol signal to +/−20 around the Tag Patrol value or 10 to 50 mph. Since the patrol speed is now outside these limits it is not immediately found by the patrol search routine. However, after 500 milliseconds, the Tag Counter runs out and clears the Tag Patrol variable and 65 mph is captured and displayed as the patrol speed. If the operator now places the radar unit back into standby, 65 mph is stored in the Tag Patrol variable.

In a shadowing example, suppose the patrol vehicle is traveling 40 mph and the radar unit is in standby with the radar not transmitting. The officer sees a vehicle traveling in the same direction as the patrol vehicle (traveling at 55 mph) and switches the radar unit to transmitting. Initially, the subtracted signal of the patrol vehicle and the target vehicle is found and displayed as the patrol vehicle speed traveling 15 mph. The officer quickly switches into and out of standby (within 500 milliseconds). The Suppress Patrol variable is set to the value of 15 mph and the system searches for the patrol vehicle speed in the range of 10 to 100 mph excluding the interval of 10 to 20 mph. The actual patrol signal is located (40 mph) and displayed. The target signal may now be located and the target vehicle speed determined and displayed (55 mph).

It is to be understood that while certain forms of an embodiment of this invention have been illustrated and described, it is not limited thereto except insofar as such limitations are included in the following claims.

The invention claimed is:

1. In a traffic radar system used in moving radar enforcement, wherein said system has a processor, a memory and software stored in said memory, a method executed by the processor in accordance with said software for capturing the patrol vehicle speed from radar return signals comprising the steps of:
   (a) receiving radar return signals containing a return signal corresponding to the speed of the patrol vehicle,
   (b) searching said return signals to identify the patrol vehicle return signal,
   (c) storing said patrol vehicle return signal in the memory when said traffic radar enters a standby mode, and
   (d) when said traffic radar reenters a transmitting mode within a predetermined time period, searching the memory for a new patrol signal over a range that excludes an interval around the stored patrol vehicle return signal.

2. The method as claimed in claim 1, wherein said predetermined time period is approximately one-half second.

3. The method as claimed in claim 1, wherein said interval is plus or minus approximately five miles per hour.

4. The method as claimed in claim 1, further comprising the step of:
   (e) if said new patrol signal is not found in step (d), searching the memory for said new patrol signal without excluding said interval.

5. In a traffic radar system used in moving radar enforcement, wherein said system has a processor, a memory and software stored in said memory, a method executed by the processor in accordance with said software for capturing the patrol vehicle speed from radar return signals comprising the steps of:
   (a) receiving radar return signals containing a return signal corresponding to the speed of the patrol vehicle,
   (b) searching said return signals to identify the patrol vehicle return signal,
   (c) storing said patrol vehicle return signal in the memory when said traffic radar enters a standby mode, and
   (d) searching for a new patrol signal within a speed window around said stored patrol vehicle return signal when said traffic radar reenters a transmitting mode after the expiration of a predetermined time period.

6. The method as claimed in claim 5, wherein said speed window is plus or minus approximately twenty miles per hour.

7. The method as claimed in claim 5, wherein said predetermined time period is approximately one-half second.

8. The method as claimed in claim 5, further comprising the step of:
   (e) searching for said new patrol signal without limitation to said speed window if said new patrol signal is not found in the search of step (d).

9. The method as claimed in claim 5, further comprising the step of:
   (e) when said traffic radar reenters a transmitting mode within said predetermined time period, searching for a new patrol signal over a range that excludes an interval around the stored patrol vehicle return signal.

10. The method as claimed in claim 9, further comprising the step of:
   (f) if said new patrol signal is not found in step (e), searching for said new patrol speed signal without excluding said interval.

* * * * *